(12) United States Patent
Hollingsworth

(10) Patent No.: US 6,308,968 B1
(45) Date of Patent: Oct. 30, 2001

(54) COLLAPSIBLE HUNTING CART APPARATUS

(76) Inventor: Jerry W. Hollingsworth, 138 Keith Ave., Rockingham, NC (US) 28379

( * ) Notice: Subject to any disclaimer, the term of this patent is extended or adjusted under 35 U.S.C. 154(b) by 0 days.

(21) Appl. No.: 09/522,500

(22) Filed: Mar. 10, 2000

(51) Int. Cl.⁷ ..................................................... B62B 1/12
(52) U.S. Cl. ........................................ 280/47.24; 280/655
(58) Field of Search .............................. 280/35, 638, 651, 280/652, 655, 656, 659, 47.17, 47.19, 47.24, 47.26, 79.3

(56) References Cited

U.S. PATENT DOCUMENTS

| D. 327,968 | | 7/1992 | Wright . | |
|---|---|---|---|---|
| 1,460,266 | * | 6/1923 | Monroe | 280/47.24 |
| 2,602,675 | | 7/1952 | Forman . | |
| 4,017,091 | * | 4/1977 | Wallen | 280/47.26 |
| 4,373,737 | | 2/1983 | Cory et al. . | |
| 4,448,434 | * | 5/1984 | Anderson | 280/655 |
| 4,789,180 | * | 12/1988 | Bell | 280/652 |
| 5,263,727 | | 11/1993 | Libit et al. . | |
| 5,295,556 | | 3/1994 | Mullin . | |
| 5,328,192 | * | 7/1994 | Thompson | 280/47.24 |
| 5,330,217 | * | 7/1994 | McCarthy | 280/79.3 |
| 5,340,134 | * | 8/1994 | Dodson | 280/656 |
| 5,476,282 | * | 12/1995 | Dahl | 280/651 |
| 5,586,778 | | 12/1996 | Lindh et al. . | |
| 5,645,292 | * | 7/1997 | McWilliams et al. | 280/47.26 |
| 5,853,189 | * | 12/1998 | Swartzlander | 280/652 |
| 5,887,879 | * | 3/1999 | Chumley | 280/47.24 |
| 6,000,713 | * | 12/1999 | Lin | 280/652 |

FOREIGN PATENT DOCUMENTS

| 276584 | * | 7/1951 | (CH) | 280/47.24 |
|---|---|---|---|---|
| 289835 | * | 3/1953 | (CH) | 280/652 |
| 2003546 | * | 11/1993 | (RU) | 280/652 |

* cited by examiner

*Primary Examiner*—Frank Vanaman

(57) ABSTRACT

A collapsible hunting cart apparatus for collapsing into a storage position for easy carrying. The collapsible hunting cart apparatus includes a pair of elongate arms. A plurality of connector bars connects the elongate arms. Each of the connecting bars has pair of ends. Each of the ends of the plurality of connecting bars is coupled to one of the elongate arms. A pair of wheels has an operative position and a storage position. In the operative position each of the wheels is rotatably mounted to one of the elongate arms. Each of the wheels is releasably coupled to the elongate arms. A first bracket and a second bracket hold the wheels in a storage position. The first bracket is fixedly coupled to a generally central portion of one of the connector bars. The second bracket is fixedly coupled to a generally central portion of another of the connector bars.

1 Claim, 4 Drawing Sheets

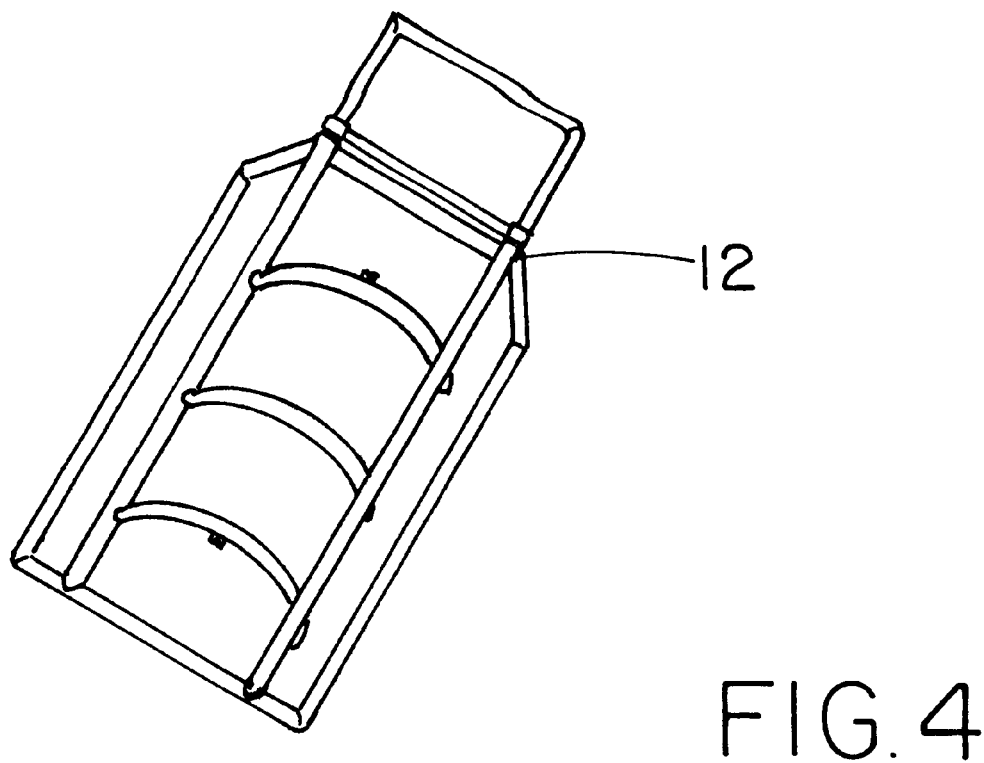
FIG. 4
FIG. 5
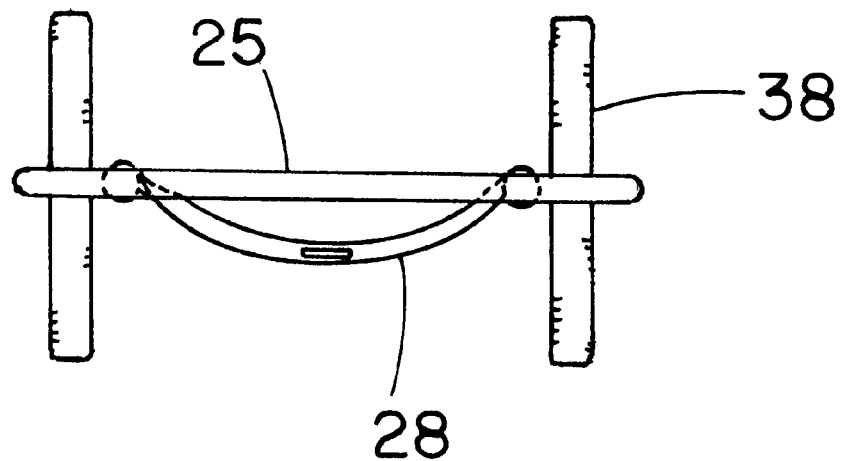

COLLAPSIBLE HUNTING CART APPARATUS

BACKGROUND OF THE INVENTION

1. Field of the Invention

The present invention relates to hunting carts and more particularly pertains to a new collapsible hunting cart apparatus for collapsing into a storage position for easy carrying.

2. Description of the Prior Art

The use of hunting carts is known in the prior art. More specifically, hunting carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,295,556; U.S. Pat. No. 5,586,778; U.S. Pat. No. 4,373,737; U.S. Pat. No. 2,602,675; U.S. Pat. No. 5,263,737; and U.S. Des. Pat. No. 327,968.

While these devices fulfill their respective, particular objectives and requirements, the aforementioned patents do not disclose a new collapsible hunting cart apparatus. The inventive device includes a pair of elongate arms. A plurality of connector bars connects the elongate arms. Each of the connecting bars has pair of ends. Each of the ends of the plurality of connection bars is coupled to one of the elongate arms. A pair of wheels has an operative position and a storage position. In the operative position each of the wheels is rotatably mounted to one of the elongate arms. Each of the wheels is releasably coupled to the elongate arms. A first bracket and a second bracket hold the wheels in a storage position. The first bracket is fixedly coupled to a generally central portion of one of the connector bars. The second bracket is fixedly coupled to a generally central portion of another of the connector bars.

In these respects, the collapsible hunting cart apparatus according to the present invention substantially departs from the conventional concepts and designs of the prior art, and in so doing provides an apparatus primarily developed for the purpose of collapsing into a storage position for easy carrying.

SUMMARY OF THE INVENTION

In view of the foregoing disadvantages inherent in the known types of hunting carts now present in the prior art, the present invention provides a new collapsible hunting cart apparatus construction wherein the same can be utilized for collapsing into a storage position for easy carrying.

The general purpose of the present invention, which will be described subsequently in greater detail, is to provide a new collapsible hunting cart apparatus apparatus and method which has many of the advantages of the hunting carts mentioned heretofore any many novel features that result in a new collapsible hunting cart apparatus which is not anticipated, rendered obvious, suggested, or even implied by any of the prior art hunting carts, either alone or in any combination thereof.

To attain this, the present invention generally comprises a pair of elongate arms. A plurality of connector bars connects the elongate arms. Each of the connecting bars has pair of ends. Each of the ends of the plurality of connecting bars is coupled to one of the elongate arms. A pair of wheels has an operative position and a storage position. In the operative position each of the wheels is rotatably mounted to one of the elongate arms. Each of the wheels is releasably coupled to the elongate arms. A first bracket and a second bracket hold the wheels in a storage position. The first bracket is fixedly coupled to a generally central portion of one of the connector bars. The second bracket is fixedly coupled to a generally central portion of another of the connector bars.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new collapsible hunting cart apparatus apparatus and method which has many of the advantages of the hunting carts mentioned heretofore and many novel features that result in a new collapsible hunting cart apparatus which is not anticipated, rendered obvious, suggested, or even implied by any of the prior art hunting carts, either alone or in any combination thereof.

It is another object of the present invention to provide a new collapsible hunting cart apparatus which may be easily and efficiently manufactured and marketed.

It is a further object of the present invention to provide a new collapsible hunting cart apparatus which is of a durable and reliable construction.

An even further object of the present invention is to provide a new collapsible hunting cart apparatus which is susceptible of a low cost of manufacture with regard to both materials and labor, and which accordingly is then susceptible of low prices of sale to the consuming public, thereby making such collapsible hunting cart apparatus economically available to the buying public.

Still yet another object of the present invention is to provide a new collapsible hunting cart apparatus which provides in the apparatuses and methods of the prior art some of the advantages thereof, while simultaneously overcoming some of the disadvantages normally associated therewith.

Still another object of the present invention is to provide a new collapsible hunting cart apparatus for collapsing into a storage position for easy carrying.

Yet another object of the present invention is to provide a new collapsible hunting cart apparatus which includes a pair of elongate arms. A plurality of connector bars connects the elongate arms. Each of the connecting bars has pair of ends. Each of the ends of the plurality of connecting bars is coupled to one of the elongate arms. A pair of wheels has an operative position and a storage position. In the operative position each of the wheels is rotatably mounted to one of the elongate arms. Each of the wheels is releasably coupled to the elongate arms. A first bracket and a second bracket hold the wheels in a storage position. The first bracket is fixedly coupled to a generally central portion of one of the connector bars. The second bracket if fixedly coupled to a generally central portion of another of the connector bars.

Still yet another object of the present invention is to provide a new collapsible hunting cart apparatus that concave connecting bars for supporting the carcass of an animal without fear of the carcass falling off of the cart.

Even still another object of the present invention is to provide a new collapsible hunting cart apparatus that has guard rails to protect the wheels from brush.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic plan view of an alternate embodiment of the present invention.

FIG. 5 is a schematic end view of the present invention.

DESCRIPTION OF THE PREFERRED EMBODIMENT

Figure 1:
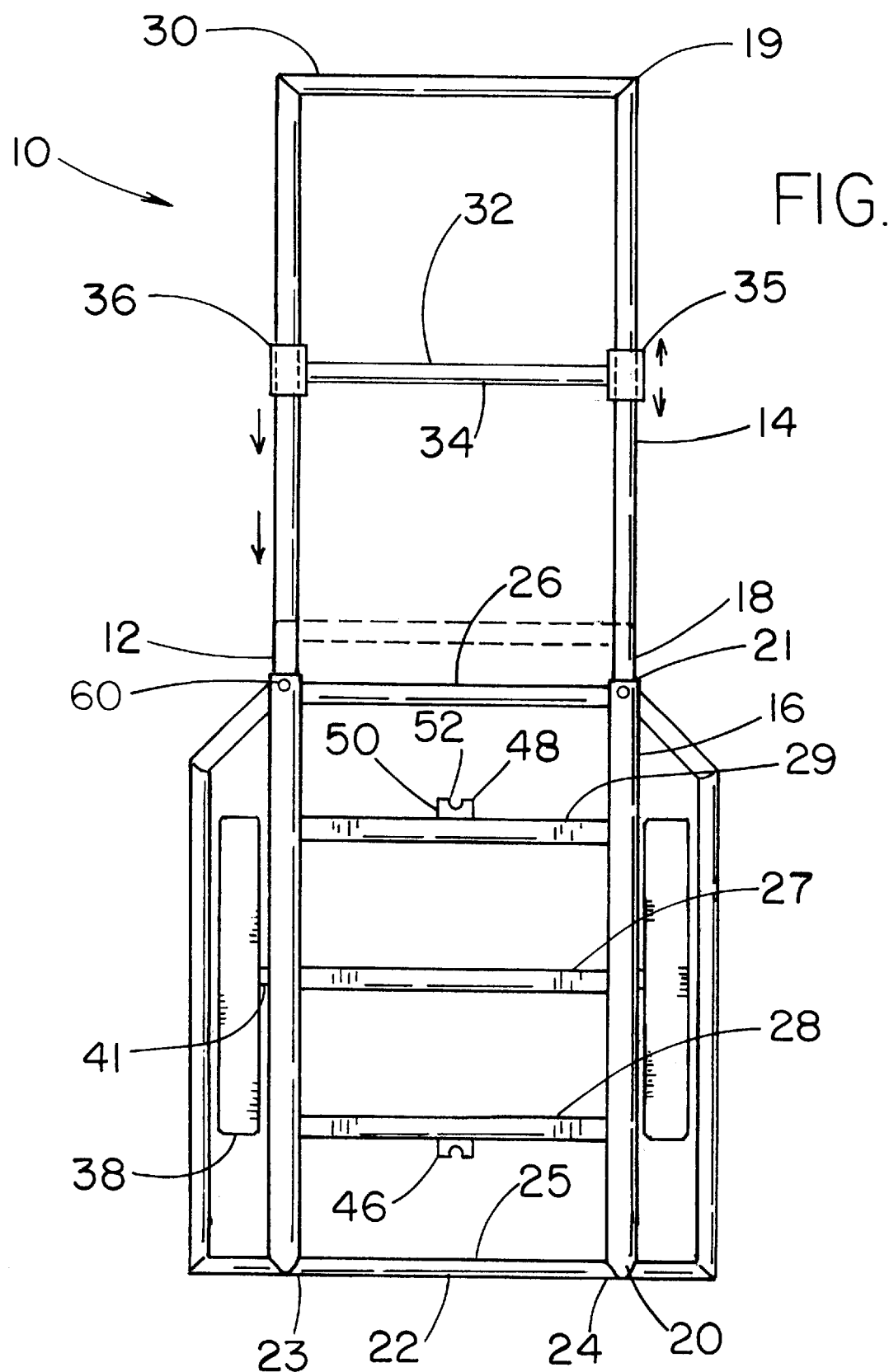
FIG. 1 is a schematic plan view of a new collapsible hunting cart apparatus according to the present invention.

With reference now to the drawings, and in particular to FIGS. 1 through 5 thereof, a new collapsible hunting cart apparatus embodying the principles and concepts of the present invention and generally designated by the reference numeral 10 will be described.

As best illustrated in FIGS. 1 through 5, the collapsible hunting cart apparatus 10 generally comprises a pair of elongate arms 12. Each of the elongate arms is a telescoping arm. Each of the arms 12 has a first portion 14 and a second portions 16. The first portions 14 have a first end 18 and a second end 19, and the second portions 16 have a first 20 and second end 21. The first end 18 of each of the first portions 14 is slidably insertable into the second end 21 of one of the second portions 16. A length of each of the elongate arms 12 is variable. Each of the arms 12 has a generally cylindrical shape.

A plurality of connector bars 22 connects the elongate arms. Each of the connecting bars has pair of ends 23, 24. Each of the ends of a first 25 through fifth 29 connecting bar is coupled to one of the second portions 16 of the elongate arms 12. The first connecting bar 25 is generally located adjacent to the second ends 20 of the second portions 16. The second bar 26 is generally adjacent to the first ends 21 of the second portions. The third bar 27 is generally located in a middle portion of the second portions 16 between the first 25 and second 26 connector bars. The fourth connector bar 28 is generally located between the third connector bar 27 and the first connector bar 25. The fifth connector bar 29 is generally located between the second connector bar 26 and the third connector bar 27. Each of the first 25 through fifth 29 connector bars is oriented generally perpendicular longitudinal axes of the first and second elongate arms 12. Preferably, each of the third 27, fourth 28 and fifth 29 connector bars is concave such that each of the third, fourth and fifth connector bars bend out of a plane extending between the pair of elongate arms. This is best depicted in FIG. 5. FIG. 4 shows the same three connector bars bending toward the second connecting bar 27. A sixth connector bar 30 is coupled to the second ends 19 of the first portions 14 of the elongated arms 12.

A sliding bar 32 acts as a support between the elongate arms 12. The sliding bar 32 is slidably mounted on and between the first portions 14 of the elongate arms 12. The sliding bar 32 has a middle section 34, a first end 35 and a second end 36. The first 35 and second 36 ends of the sliding bar have tubes thereon. Each of the tubes has a longitudinal axis oriented generally perpendicular to a longitudinal axis of the middle section 34. Each of the tubes has a diameter adapted to slide along the first portions 14 of the elongate arms 12. Ideally, all of the bars and elongate arms are hollow and made from aluminum in order to keep the cart light.

Figure 2:
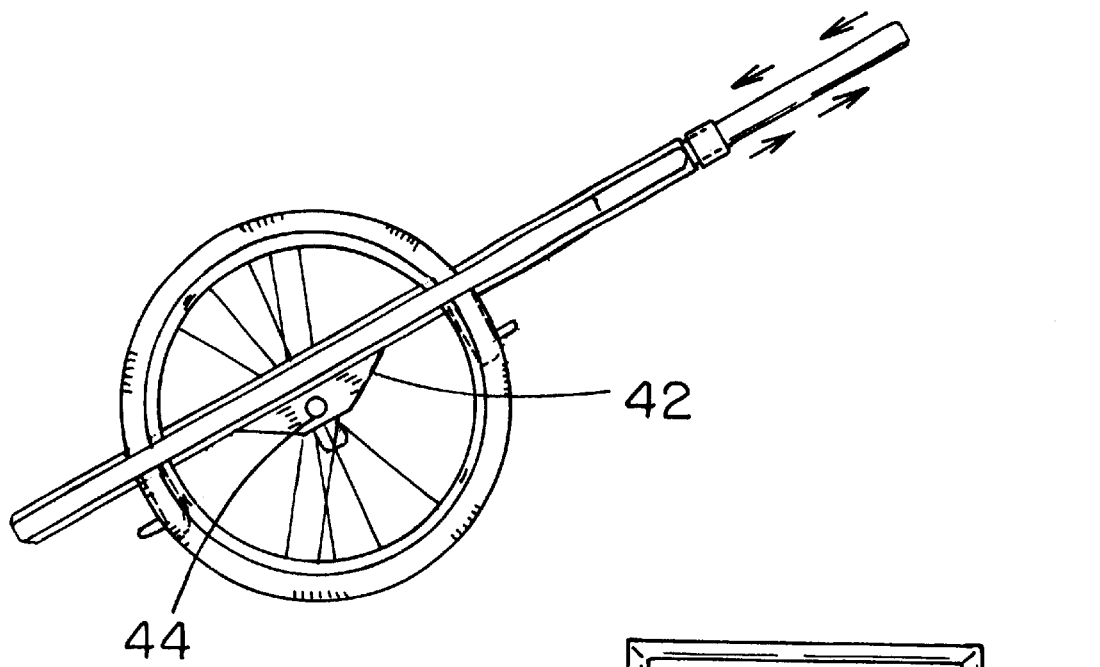
FIG. 2 is a schematic side view of the present invention.

A pair of wheels 38 has an operative position and a storage position. In the operative position, as depicted in FIGS. 1 and 2, each of the wheels 38 is rotatably mounted to one of the second portions 16 of the elongate arms 12. Each of the wheels 38 is generally adjacent to the third connector bar 27. The wheels 38 are releasably coupled to the second portions of the elongate arms. The wheels 38 each have a hub 40 and a shaft 41 attached thereto.

A pair of plates 42 for mounting the wheels 38 to is mounted to one of the second portions 16 of the elongate arms 12. Each of the plates 42 extends in the same direction away from the second portions 14. The plates 42 have planes oriented generally parallel to each other. Each of the plates 42 has a bore therein. The bores 44 are adapted for receiving the shafts 41 of the wheels 38 in the operative position.

Figure 3:
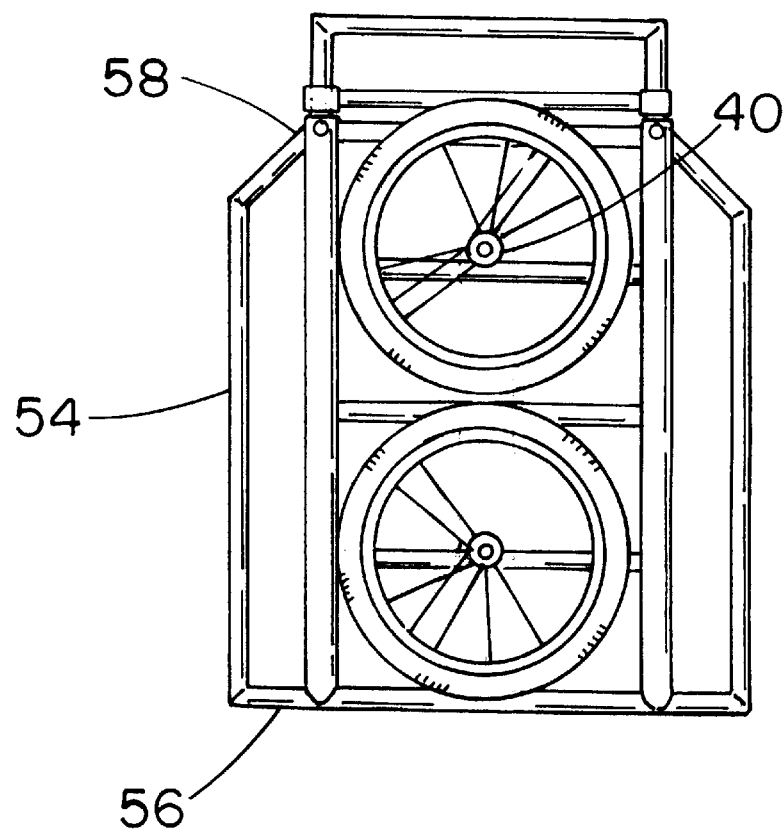
FIG. 3 is a schematic plan view of the present invention.

A first bracket 46 and a second bracket 48 hold the wheels in a storage position as shown in FIG. 3. The first bracket 46 is fixedly coupled to a generally central portion of the fourth connector bar 28. The second bracket 48 is fixedly coupled to a generally central portion of the fifth connector bar 29. The brackets 46, 48 have a longitudinal axis oriented generally perpendicular to the longitudinal axes of the elongate arms 12. Each of the brackets extends in substantially the same direction. The brackets have a U-shaped end. Each of the U-shaped ends has a base portion 50 and two legs 52. The legs 52 of the end of the first bracket 46 extend towards the first connecting bar 25. The legs of the end of the second bracket 48 extend towards the second connecting bar 26, wherein each of the shafts 41 of the wheels 38 is removably coupled to one of the U-shaped ends.

A pair of guard rails 54 guard the wheels 38. Each of the rails 54 is connected to one of the second portions 16 of the elongate arms 12. The guard rails 54 have a first end 56 and a second end 58. The first ends 56 of each of the guard rails 54 are generally located adjacent to a first end 20 of the second portions. The second ends 58 of each of the guard rails are located generally adjacent to the second ends 21 of the second portions 16. Each of the guard rails 54 is shaped to extend around the wheels 38 when the shafts 41 are in the bores 44. Each of the guard rails 54 is generally in a plane formed by the elongate arms 12 and the connector bars, wherein the guard rails 54 may direct brush away from the wheels during movement of the cart.

A bore 60 extends through each of the second portions 16 of the arms generally adjacent to the second ends 21. A bore, not shown, extends through the first portion 14 of the arms as well. The bores 60 in the second portion are coaxial with the bores in the first portion when the arms are in an extended position as shown in FIG. 1. The bores have a pin, not shown, placed therein to selectively lock the arms in an extended position.

Figure 6:
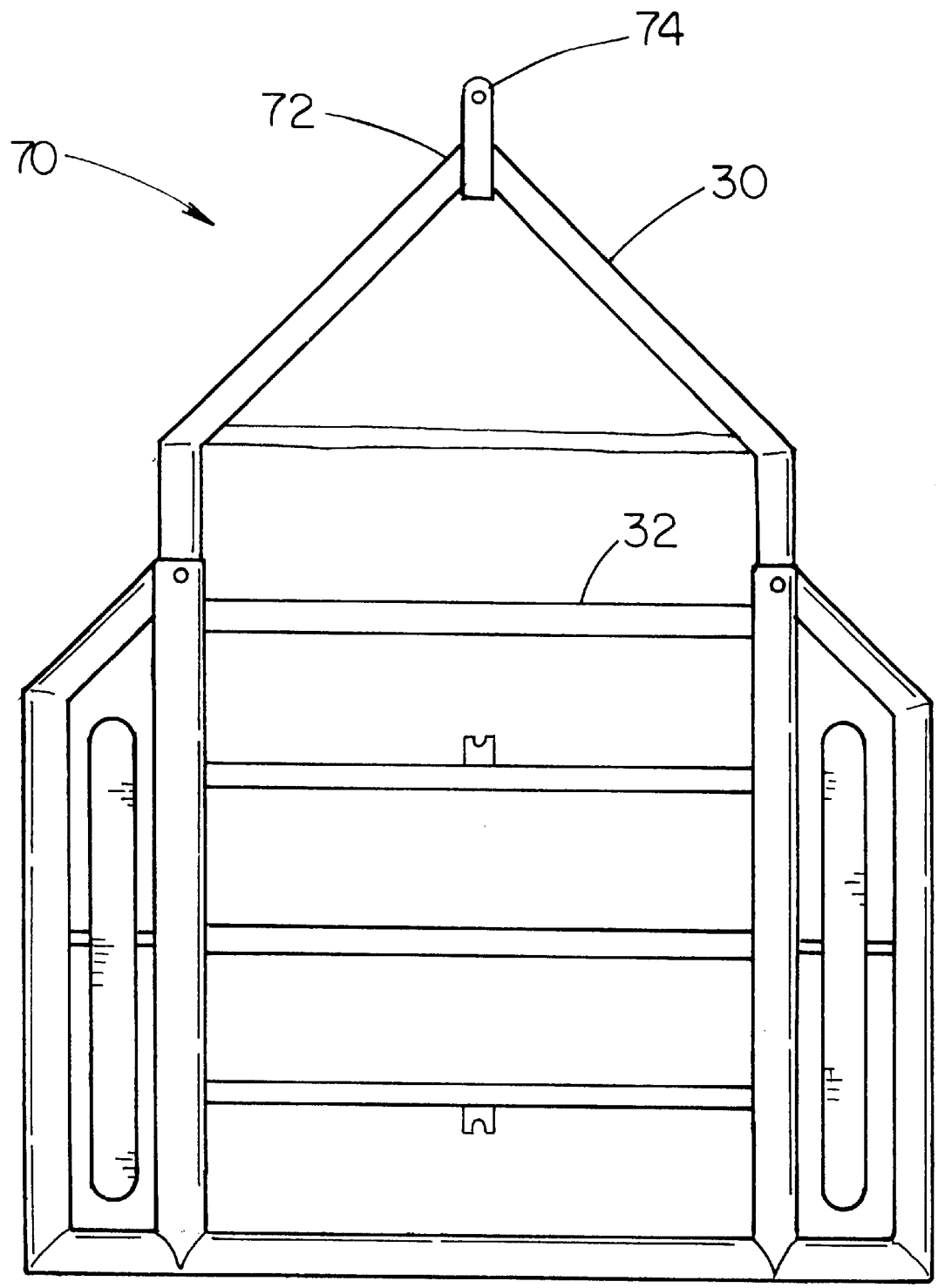
FIG. 6 is a schematic plan view of the second embodiment of the present invention.

A second embodiment, shown in FIG. 6, uses a hitch device 70 for coupling the cart apparatus 10 to the hitch of a vehicle. In the second embodiment, the sixth bar 30 is bent away from the fifth bar. At an apex 72 of the sixth bar is a bracket 74 which extends away from the fifth bar. The bracket 74 is a standard bracket used for hitching a trailer to a vehicle or all terrain vehicle.

In use, the wheels 38 are placed in the storage position and the first portions 14 of the elongate arms 12 are inserted into the second portions 16 of the elongate arms. In this position, the cart is strapped to the back of the user or simply carried. When needed, the wheels 38 are mounted on the plates 42, the animal is placed on the connecting bars, and the cart is wheeled out of the area. The user may stand outside of the cart or between the first portions 14, the sixth connecting bar 30 and the sliding bar 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible hunting cart apparatus, said apparatus comprising:

a pair of elongate arms, each of said elongate arms being telescoping arms, each of said arms having a first portion and a second portion, each of said portions having a first end and a second end, said first end of each of said portions being slidably insertable into said second end of one of said portions, a length of each of said elongate arms being variable, each of said arms having a generally cylindrical shape;

a plurality of connector bars for connecting said elongate arms, each of said connector bars having pair of ends, each of said ends of a first through fifth connector bar being coupled to one of said second portions of said elongate arms, said first connector bar being generally located adjacent to said second ends of said second portions, said second bar being generally adjacent to said first ends of said second portions, said third bar being generally located in a middle portion of said second portions between said first and second connector bars, said fourth connector bar being generally located between said third connector bar and said first connector bar, said fifth connector bar being generally located between said second connector bar and said third connector bar, each of said first through fifth connector bars being oriented generally perpendicular to longitudinal axes of said first and second elongate arms, each of said third, fourth and fifth connector bars being concave such that each of said third, fourth and fifth connector bars bend out of a plane extending between said pair of elongate arms, a sixth connector bar, said sixth connector bar being coupled to said second ends of said first portions of said elongate arms;

a sliding bar for acting as a support between said elongate arms, said sliding bar being slidably mounted on and between said first portions of said elongate arms, said sliding bar having a middle section, a first end and a second end, said first and second ends of said sliding bar having tubes thereon, each of said tubes having a longitudinal axis oriented generally perpendicular to a longitudinal axis of said middle section, each of said tubes having a diameter adapted to slide along said first portions of said elongate arms;

a pair of wheels, said wheels having an operative position and a storage position, in said operative position each of said wheels being rotatably mounted to one of said second portions of said elongate arms, each of said wheels being generally adjacent to said third connector bar, each of said wheels being releasably coupled to said second portions of said elongate arms, each of said wheels having a hub, each of said hubs having a shaft attached thereto;

a pair of plates for mounting said wheels to, each of said plates being mounted to one of said second portions of said elongate arms, each of said plates extending in the same direction away from said second portions, one of said plates having a plane oriented generally parallel to a plane of the other of said plates, each of said plates having a bore therein, each of said bores being adapted for receiving one of said shafts of said wheels in said operative position;

a first bracket and a second bracket for holding said wheels in a storage position, said first bracket being fixedly coupled to a generally central portion of said forth connector bar, said second bracket being fixedly coupled to a generally central portion of said fifth connector bar, each of said brackets having a longitudinal axis oriented generally perpendicular to said longitudinal axes of said elongate arms, each of said brackets extending in substantially the same direction, each of said brackets having a U-shaped end, each of said U-shaped ends having a base portion and two legs, each of said legs of said end of said first bracket extending towards said first connecting bar, each of said legs of said end of said second bracket extending towards said second connecting bar, wherein each of said shafts of said wheels being removably coupled to one of said U-shaped ends; and a pair of guard rails for guarding the wheels, each of said rails being connected to one of said second portions of said elongate arms, each of said guard rails having a first end and a second end, said first ends of each of said guard rails being generally located adjacent to a first end of said second portions, said second ends of each of said guard rails being located generally adjacent to said second ends of said second portions, each of said guard rails being shaped to extend around said wheels when said shafts are in said bores, each of said guard rails being generally in a plane formed by said elongate arms and said connector bars, wherein said guard rails may direct brush away from said wheels during movement of the cart.

* * * * *